United States Patent

[11] 3,564,146

[72] Inventors Werner F. Poschenrieder; Max Schlichte; Allan Darre, Munich Germany

[21] Appl. No. 600,904
[22] Filed Dec. 12, 1966
[45] Patented Feb. 16, 1971
[73] Assignee Siemens Aktiengesellschaft Munich and Berlin, Germany
[32] Priority Dec. 14, 1965
[33] Germany
[31] S100956

[54] FREQUENCY FILTER CONTROLLED BY PULSE TRAINS
22 Claims, 8 Drawing Figs.

[52] U.S. Cl. .......... 179/15; 307/246; 328/122; 333/70
[51] Int. Cl. .......... H04j 3/00
[50] Field of Search .......... 179/15 (ART), 170, 170 (C); 333/70 (A), 76; 307/246, 294; 328/122, 151

[56] References Cited

UNITED STATES PATENTS 3,408,504 10/1968 Holzwarth .......... 179/15X(ART)
3,413,418 11/1968 Gaunt .......... 179/15(ART)
3,117,185 1/1964 Adelaar .......... 179/15(ART)
3,399,278 8/1968 Dahlman .......... 179/15(ART)

*Primary Examiner*—Ralph D. Blakeslee
*Attorney*—Irons, Birch, Swindler & McKie

ABSTRACT: An improved frequency filter responsive to control pulses which determine the characteristic frequency thereof. Switches operated by the control pulses complete circuits for effecting pulse-type energy exchanges in associated storage capacitors. Special circuit provisions substantially eliminate energy losses in the filter.

FREQUENCY FILTER CONTROLLED BY PULSE TRAINS

CROSS REFERENCE TO RELATED APPLICATION

Applicants claim priority from corresponding German application Ser. No. S100,956, filed Dec. 14, 1965.

BACKGROUND OF THE INVENTION

1. Field of the Invention

This invention relates to frequency filters and more particularly to frequency filters including switches which are controlled by periodic, control pulses. 2. Description of the Prior Art The prior art teach frequency filters employing switches which are controlled by time-spaced control pulses. (See Trans IRE PGAE, Dec. 1953, pp. 21—26 .) The characteristic frequency of these prior art filters is determined by the pulse repetition rate of the control pulses. These prior art filters further include storage capacitors which register a charge, and thus a voltage, corresponding to a scanning sample derived from the applied signal for a certain time interval. In the operation of such filters, the storage capacitors are periodically charged and discharged as a result of closing of the switches in response to the control pulses. Such charging and discharging results in energy losses, causing attenuation of the signal being filtered.

It is known to operate prior art frequency filters to function as parallel resonant circuits. In such operations, signal impulses, representing periodic scanning samples of the signal to be filtered, are transmitted to the various storage capacitors of the filter. The scanning sample may be developed from the applied signal by a scanning switch which is actuated at a fixed frequency, the output of the scanning switch being applied to the filter input. Alternatively, the signal may itself be an amplitude modulated pulse train of fixed repetition rate. When the voltages developed across the storage capacitors correspond to the voltage levels of the scanning samples, the filter then acts as a parallel resonant circuit in response to the applied signal impulses, and derives no energy from the applied signal. The blocking function therefore occurs for the characteristic frequency of the filter, which characteristic frequency is selected to be that of the scanning samples. The blocking function also occurs at frequencies other than the characteristic filter frequency and, more specifically, at whole multiples, or harmonics, of the characteristic filter frequency.

Energy losses occur in prior art frequency filters, which result in attenuation of the applied signal at the frequencies of interest. Such losses may occur, for example, due to the unavoidable dissipation of the charges stored in the capacitors, such as those resulting from discharges through the dielectric material of the storage capacitor. It is necessary that these losses be compensated, and prior art systems typically accomplish this compensation by deriving additional charging energy from the applied signal during the scanning samples. This form of compensation is undesirable, however, since it loads the input signal source and typically results in distortion of the input signals. Other losses which typically occur in known prior art frequency filters result from dissipation of energy in the resistors of the circuit or in the inherent resistance of leads and other elements associated with the filter circuit.

BRIEF DESCRIPTION OF THE INVENTION

These and other defects and disadvantages of prior art filter circuits of the control pulse actuated types are overcome by the filter circuits of the invention. In particular, energy losses are compensated or eliminated without the necessity of deriving any substantial energy from the input signals.

In addition to compensating for losses occurring within the filter, the invention provides for operation of a frequency filter in a manner to provide filter qualities not heretofore attainable with prior art filters. The rate of charging of the storage capacitors of the filter is substantially increased, providing finer tuning, or peaking, of the filter resonance curve. The loss compensation means of the invention may provide overcompensation for losses, and substantially improve the peak resonance characteristics of the filter. The characteristic frequencies of the filters may be charged by the simple expedient of changing the control pulse repetition rate. Furthermore, the intervals between adjacent characteristic frequencies of the filter, such as the effective resonant frequency and harmonics thereof, can be changed without changing the control pulse repetition rate through the provision of additional circuit means.

In accordance with the invention, the frequency filter comprises switches which are controlled by periodic control pulses which determine the characteristic frequency of the filter. The switch actuation results in a pulse-type energy exchange between the capacitors associated with a given switch. By contrast to prior art switching-type filters in which there occur only equalization of charges between two capacitors associated with a given switch, in the filters of the invention, the entire charge energy of a storage capacitor participating in a charge exchange is transmitted to the other, associated capacitor also participating in the given exchange. The charge equalization technique employed by the prior art therefore is not capable of attaining the highly advantageous characteristics of the frequency filters of the invention, but rather results in substantial attenuation of the signal energy.

The frequency filters of the invention may be constructed either as quadripole, of four terminal, networks or as bipole, or two terminal networks. Additional switching and compensation means may be provided in accordance with the invention to substantially eliminate losses of signal energy within the filter. The loss compensation system of the invention furthermore may provide overcompensation, whereby heretofore unattainable filter characteristics may be developed.

DETAILED DESCRIPTION OF THE INVENTION

The frequency filters of the invention employ storage capacitors and switching elements, the switching elements being controlled by control pulses of predetermined pulse repetition rate to effect energy or charge exchanges between associated storage capacitors of the filter.

Figure 1:
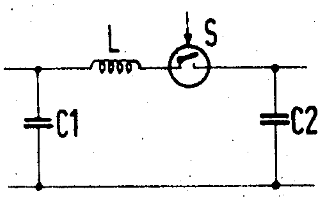
FIGS. 1 and 2 shown alternative embodiments of loss-compensation switching systems suitable for use in the frequency filters of the invention.
Figure 2:
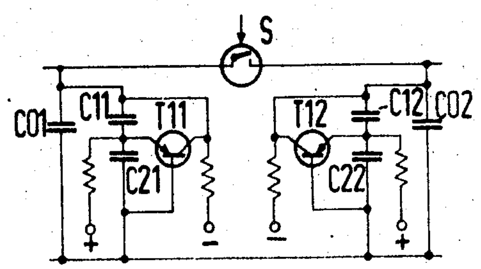

In FIGS. 1 and 2 the storage capacitors are connected in shunt between a pair of line conductors, a switch S being connected in circuit in one of the line conductors to control the energy exchange between the associated shunt capacitors. FIGS. 1 and 2 represent alternative techniques for compensating for losses occurring during these energy exchanges.

In FIG. 1, the switch S is connected in series with an inductance coil L in the first line conductor between the shunt capacitors C1 and C2. Switch S is periodically closed by control pulses applied thereto and indicated illustratively by an arrow directed toward the movable contact of switch S. Upon closure of switch S, inductor L and switch S are connected in series between capacitors C1 and C2. This series circuit has a resonant frequency defined by the values of the capacitors C1 and C2 of he the inductor L. Switch S is closed for a time interval equal to that of one-half of a cycle, or one-half of the period, of the resonant frequency. If initially there is present a certain charge on one or both of the shunt capacitors C1 and C2, and assuming that the capacitors C1 and C2 are of equal capacitance values, a complete energy exchange or interchange occurs between the two shunt capacitors C1 and C2. This circuit arrangement for avoiding loss of signal impulses energy is well known. (See, for example, "Pulse Generators" by Glasee and Lebacqz, 1948, pp. 307—308, FIGS. 8.17 and 8.18.) If the capacitors C1 and C2 are not of the same capacitance value, the charge exchange will be modified in accordance with the relative capacitance values, in a manner explained in more detail hereafter.

FIG. 1 may be modified by substituting a short circuit connection in place of shunt capacitor C2. This modification effects a substantial change in the operating conditions of the circuit of FIG. 1. By closing switch S for one-half period of the resonant frequency of the inductor L and capacitor C1, the charge initially present on capacitor C1 is thereafter again developed on capacitor C1 in substantially the identical magnitude but of opposite polarity. Such a charge reversal is well known in the art.

The inductor L, inserted between the two respectively associated shunt capacitors, therefore, is effective to assure that the desired energy interchange between the associated shunt capacitors C1 and C2 is performed, whether it be a complete of or partial exchange. The loss of one-half of the transmitted energy, which otherwise would occur in the absence of such an inductor, is avoided. As noted previously, prior art circuits which effect only charge equalization in a pulse-type energy exchange are subjected to the loss of one-half of the stored charge which is to be transmitted. Thus, utilization of the inductor L prevents the occurrence of losses which would otherwise occur and are frequently encountered in prior art circuits.

In FIG. 2, the switch S, which may be identical to that of FIG. 1 which is operated likewise by a train of periodic control pulses, is connected in circuit in a first line conductor of a pair of line conductors. Storage capacitors C01 and C02 are connected in shunt between the line conductors and on opposite sides of the switch S. For the purposes of the initial discussion, it is assumed that the capacitors C01 and C02 are of equal capacitance values. A pulse-type energy exchange between shunt capacitors C01 and C02 is controlled by the closure of switch S in response to each control pulse. The energy losses are compensated through the provision of parallel supplemental capacitors and amplifier elements associated with the capacitors C01 and C02.

Generally, each supplemental capacitor is charged by the amplifier element from the latter's energizing current source during the time period preceding an energy exchange, whereby the voltage on the supplemental capacitor corresponds to that across the corresponding shunt capacitor. During the subsequently occurring pulse-type energy exchange between the shunt capacitors, the energy stored in the supplemental capacitor is available to compensate for losses to assure a charge transfer of the required magnitude. As a result, for each periodic closure of the switch S, and by providing supplemental capacitors of equal capacitance values to those of the respectively associated shunt capacitors, a substantially complete energy exchange is effected between the thus compensated, two shunt capacitors C01 and C02.

In FIG. 2, the the supplemental capacitor C11 is connected in parallel with the shunt capacitor C01 through a parallel network comprising the emitter-base circuit of transistor T11 and coupling capacitor C21. The transistor T11 is connected as at its collector terminal through a dropping resistor to a negative power supply terminal and at its emitter terminal through a dropping resistor to a positive power supply terminal. In an identical manner, transistor T12 and capacitor C22 connect supplemental capacitor C12 in parallel with the associated shunt capacitor C02.

In operation, one of the two shunt capacitors C01 and C02 is charged during the relatively large time interval preceding a pulse-type energy exchange, the other not being charged initially. Subsequently to the energy exchange, effected by closure of switch S, the other shunt capacitor is charged to the full amount of the charge previously established on the first shunt capacitor, which then is completely discharged. If each of the shunt capacitors is initially charged, the switching operation provides an exchange of these charges. This method of energy exchange and compensation is explained in detail in Belgium Pat. No. 657,316 (corresponding to German Pat. No. application S 88,828 and U.S. Pat Ser. No. 417,970 now Pat. No. 3,303,286 of Max Schlichte entitled "Circuit Arrangement for Pulse Energy transmission," and assigned to the assignee of the present invention). The following discussion provides a brief description of the operation of the circuit of FIG. 2, sufficient for an understanding thereof.

One condition of the circuit operation is that only negative potentials appear at the terminals of capacitors C01 and C02 which are connected with corresponding terminals of the switch S. This condition may be satisfied even where at alternating current signal impulses are applied, by providing appropriate bias potential sources. A convenient manner for maintaining the desired negative bias potential is by including a negative bias potential source in the signal impulse generator which applies the signal impulses to the circuit of FIG. 4. It is assumed in the following discussion that the necessary negative bias potential is provided.

In accordance with the previous discussions, it will be understood that a complete energy interchange occurs when the shunt capacitors C01 and C02 are of equal capacitance values. An energy interchange, though only partial, will also occur even though the shunt capacitors C01 and C02 are of different capacitance values. Each supplemental capacitor, however, is of the same impedance value as its respectively associated shunt capacitor. The switch S is operated by shift pulses, in the manner previously described, and the energy interchanged is effected substantially without any loss of energy of the charges representing the signal impulses.

Further, in accordance with the corresponding modification of FIG. 1, one of the shunt capacitors, such as capacitor C02, and its associated supplemental capacitor C12, coupling capacitor C22 and amplifier element T12 may be eliminated and in the alternative a short circuit connection provided. In accordance with this modification of the circuit of FIG. 2, a periodic closing of switch S will effect a periodic reversal of polarity of the charge initially stored on shunt capacitor C01, the magnitude of the reverse polarity charge, however, being substantially identical to that of the initial charge. Upon closure of switch S, and assuming shunt capacitor C01 and its associated supplemental capacitor C11 to have been charged initially, each of these capacitors discharges. The charge previously established on supplemental capacitor C11 charges capacitor C21, initially without charge, to a value of the same magnitude but of opposite polarity to the charge initially established on capacitor C11. As stated previously, the capacitor C11 is charged initially in the same magnitude and polarity as that of the shunt capacitor C01.

When switch S thereafter is opened, the charge stored on coupling capacitor C21 causes transistor T11 to conduct and to develop a charge on capacitors C11 and C01 corresponding to the charge established on the coupling capacitor C21. In this manner, the shunt capacitor C01 an and its associated supplemental capacitor C11 have developed thereacross a charge of equal magnitude but of opposite polarity to that charge initially established thereon. Thus, for the modified form of the compensating circuit of FIG. 2 in which shunt capacitor C02 and associated elements are replaced by a short circuit connection, closure and subsequent opening of switch S will effect a reversal of the charge on shunt capacitor C01.

Each of the circuits of FIGS. 1 and 2 is operative to substantially eliminate the loss of power during the energy interchange between the associated shunt capacitors. However, in the circuit of FIG. 1, as previously described, switch S must be closed for a precise time interval equal to that of one-half cycle or one-half of the period of the resonant frequency of the series resonant circuit of the inductor and associated shunt capacitors. Should the switch be closed for a longer period, the energy interchange will reverse in direction and the transmitted charge on the shunt capacitor C2 will begin to be retransmitted to the shunt capacitor C1. In each of FIGS. 1 and 2, however, the duration of the interval of the control pulses is independent of the pulse repetition rate thereof, under the condition that the duration of a control pulse be smaller than the period of the pulse repetition rate. An advantage of the circuit of FIG. 2 over that of FIG. 1 is that the switch S of FIG. 2 need not be closed for any specified time interval, since the energy exchange is not related to the period of a resonant circuit, as is required in the circuit of FIG. 1. The circuit of FIG. 2 therefore permits a far greater tolerance in the duration of the switching interval and thus in the duration of the control pulses.

Figure 3:
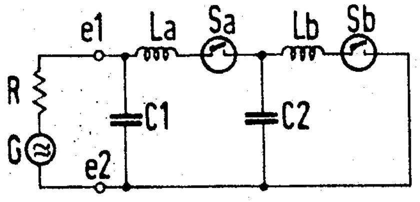
FIGS. 3 and 4 shown dipole or loss-compensation networks operative as frequency filters in accordance with the invention, and which employ the loss-compensation circuits of FIGS. 1 and 2, respectively.
Figure 4:
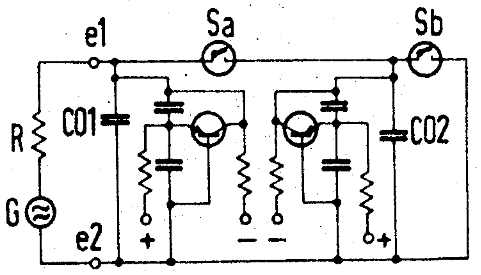

FIGS. 3 and 4 show dipole or two terminal frequency filters in accordance with the invention and employing the loss-compensation systems of FIGS. 1 and 2, respectively. Each of the frequency filters of FIGS. 3 and 4 comprises a line balancing network having a pair of line conductors connected to respectively associated input terminals *e*1 and *e*2. The frequency filters are short circuited at their output sides between the line conductors to provide the dipole or two terminal configuration.

In each filter there are provided, in the first line conductor, switches S*a* and S*b* which are closed in response to alternate ones of the periodic control pulses, whereby the switches S*a* and S*b* are closed during different time periods. Although in each of FIGS. 3 and 4 only a single filter stage is provided, and thus only two shunt capacitors and two switches, the filters may each be increased to include a plurality of and such stages. The characteristic frequency of the filter may thereby be further controlled. In such elongated filters there would be provided a plurality of switches and associated shunt capacitors. Adjacent switches in the first line conductor would be operated during different time periods between first and second trains of control pulses, as described previously. Switches separated in the first conducting line by an odd number of other switches, however, would be operated simultaneously.

In FIG. 3 there is shown a frequency filter operative as a line balancing network and constructed in accordance with the invention. An induction coil L*a* is connected in series with the switch s*a* in the first conductor line connected to terminal *e*1. Capacitors C1 and C2 are connected in shunt between the first and second line conductors. For the purposes of this explanation of the circuit operation, it is assumed that capacitors C1 and C2 are of equal capacitance values. An induction coil L*b* is connected in the first conducting line to the junction of shunt capacitor C2 and switch S*a* and in series with switch S*b*. A short circuit connection is made between the line conductor and the output side of the filter between switch S*a* and the other terminal of capacitor C2. The circuit of FIG. 3 thereby has the properties of a dipole or two terminal device with parallel resonance.

For purposes of explaining the operation of the circuit of FIG. 3, it is assumed that signal impulses of alternating polarity are applied to the input terminals *e*1 and *e*2 by a generator G connected to these terminals through resistor R. As noted, switches S*a* and S*b* are controlled by control pulses which alternately close their normally open switch contacts. The pulse repetition rate of the control pulses is selected to be four times that of the frequency of the signal impulses.

Assuming that shunt capacitor C1 is initially charged by a first signal impulse, the closure of switch S*a* in response to a first control pulse effects transmission of the charge from capacitor C1 to capacitor C2 in a pulse-type energy exchange. A second control pulse effects closure of switch S*b* which thereupon effects a reversal of the charge established on capacitor C2. The third control pulse closes switch S*a* whereby the charge now stored on capacitor C2 is retransmitted to capacitor C1. The resultant charge on capacitor C1 is of opposite polarity to the charge initially established thereon. The fourth control pulse again closes switch S*b* but, since switch S*a* is open at this time and no charge is present on capacitor C2, no further energy exchange occurs. As described hereafter, under different operating conditions the closure of the second switch S*b* in response to a fourth control pulse does produce an energy exchange.

In accordance with the foregoing assumed conditions of operation, these four control pulses occur prior to the receipt of a second signal impulse at the input terminals *e*1 and *e*2; further, it has been assumed that the signal impulses are of alternate polarity. Thus, the second signal impulse applied to the terminals *e*1 and *e*2 will be of the opposite polarity to the first signal impulse, and thus of the same polarity as the charge now established on capacitor C1. As a result, the second signal impulse produces no further charging of capacitor C1, assuming that no energy loss has occurred in the energy exchange which effected the reversal of the charge polarity on capacitor C1, whereby the dipole line balancing network receives no further energy from the second signal impulse.

Since in a practical circuit, energy losses do occur, the dipole line balancing network of FIG. 3 will receive a small amount of energy from the second signal impulse, sufficient to cover the losses occurring during the energy exchanges. For example, losses may occur in the shunt capacitors occasioned by discharge of the latter over their dielectrics. The general characteristics of the line balancing network of FIG. 3, however, are that when its effective wavelength, as determined by the pulse repetition rate of the control pulses, is 4 times that of the frequency of the signal impulses, the dipole network exhibits a blocking function. This blocking function is essentially that of a blocking circuit in parallel resonance and responding to an input signal at the resonant frequency.

The blocking function of the circuit of FIG. 3 may also be employed where the signal generator G produces a sign wave alternating current signal. In this operation, the frequency of the alternating current input signal should be one-half that of the signal impulses, on which condition the prior description of operation was based, and thus one-eighth of the pulse repetition rate of the control pulses. The blocking effect of the circuit of FIG. 3 is obtained regardless of the relative phases of the input alternating current signal and of the shift pulses. If the frequency of the input alternating current signal varies from the predetermined value, however, the blocking effect of the system of FIG. 3 is decreased substantially. This is analogous to the response of a parallel resonant circuit when the frequency of the applied input signal departs from the resonant frequency. If desired, an alternating current signal may be transformed to a train of impulses modulated in amplitude in accordance with the alternating current signal, the modulation frequency thereof being in accordance with the frequency of the alternating current signal. The previously described operation of the circuit of FIG. 3 in response to applied signal impulses of alternating polarity, in this regard, may be considered as a special case of a series of such amplitude modulated impulses.

As noted previously, under certain conditions, the fourth control pulse effecting closure of switch S*b* may cause a charge exchange. Such a condition exists when there occurs in the applied signal, whether it be an alternating signal or a train of alternating signal impulses, a signal value of opposite phase to that of the alternating signal of the foregoing example. Under this condition, capacitor C2 contains a charge at the time of the occurrence of the fourth signal impulse applied to the switch S*b*. As a result, a pulse-type charge exchange will occur in response to the fourth control pulse and will effect a reversal of the polarity of the charge established on capacitor C2. This charge on capacitor C2 will thereupon contribute to the energy exchange between capacitors C1 and C2 upon the subsequent control of switch S*a* in response to the next occurring control pulse.

The parallel resonance characteristic of the line balancing network of FIG. 3 exists for the stated relationship of the control pulse repetition rate to the frequency of an alternating signal input or to the frequency of a train of amplitude modulated signal impulses. The characteristic frequency at which the parallel resonance characteristic occurs may therefore be changed by changing the pulse repetition rate of the control pulses. As a result, the line balancing network of FIG. 3 may be tuned to any desired characteristics frequency. The characteristics frequency is a function only of the pulse repetition rate of the control pulses and thus may be held to a very accurate value by accurately controlling the repetition rate of the control pulses. Changes in the capacitance and inductance values of the elements of the line balancing network produce substantially no effect on the characteristics of the line balancing network, particularly since it may be assumed that any changes in these reactance values as may occur will be identical since the reactance elements are identical and are subjected to the same environmental conditions.

The embodiment of the invention shown in FIG. 4 comprises a frequency filter corresponding to that of FIG. 3 but wherein the circuit arrangement of FIG. 2 is employed in the alternative to that of FIG. 1 for reducing or substantially eliminating energy losses in the energy exchanges occurring during the switching operations. The operation of the circuit of FIG 4 is substantially similar to that of FIG. 3; however, the advantages of the system of FIG. 2 are obtained whereby compensation is provided for the inherent and unavoidable losses occurring in the transmission of charges through conducting lines and the losses of the shunt capacitors. The circuit of FIG. 4 may be employed with a signal source, as represented by generator G connected through resistor R to its input terminals *e*1 and *e*2, supplying either signal impulses or sign wave alternating current signals. The switches S*a* and S*b* in FIG. 4 are operated by control pulses in an identical sequence to that described in relation to FIG. 3, to produce energy exchanges between the shunt capacitors C01 and C02.

As noted previously, the line balancing networks of FIGS. 3 and 4 may include a greater number of shunt capacitors and switches whereby they are effectively increased in their length. In such increased line balancing networks, the pulse-type energy exchanges occur in a manner substantially the same as that described heretofore with relation to FIGS. 3 and 4. These elongated line balancing networks have characteristics frequencies which, in a manner analogous to conventional transmission lines, are lower, the greater the length of the line balancing network.

Line balancing networks as described above are characterized by properties substantially the same as those of uniform transmission lines, under the operating conditions in which the pulse repetition rate of control pulses which control the switches of the networks is sufficiently high. This condition is satisfied if the number of scanning samples, represented by the charges participating in the energy exchanges, satisfies the requirements of the scanning theorem, with regard to the frequency of the received signal, whether the received signal comprises amplitude modulated signal impulses or an alternating current signal.

FIGS. 5—8 comprise additional embodiment of frequency filters constructed in accordance with the invention. Each of these filters may be employed with a source of amplitude modulated signal impulses or with a source of alternating current signals. In each of these embodiments, there is provided a principal capacitor and a plurality of auxiliary capacitors. The principal capacitor participates in every energy or charge exchange occurring in the filter.

Figure 5:
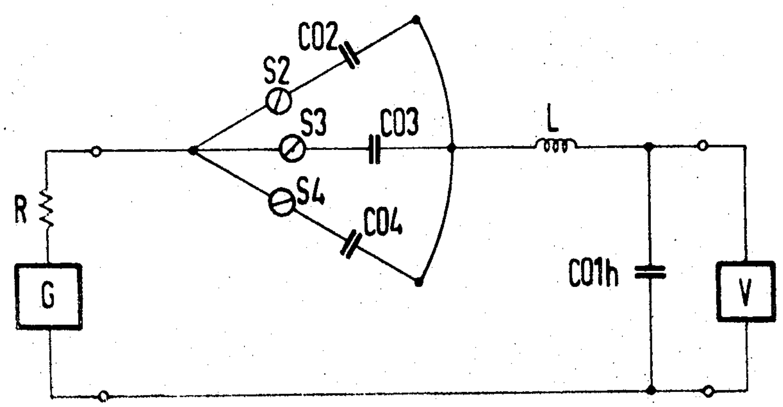
FIGS. 5 and 6 show quadripole or four terminal networks operative as frequency filters in accordance with the invention.
Figure 6:
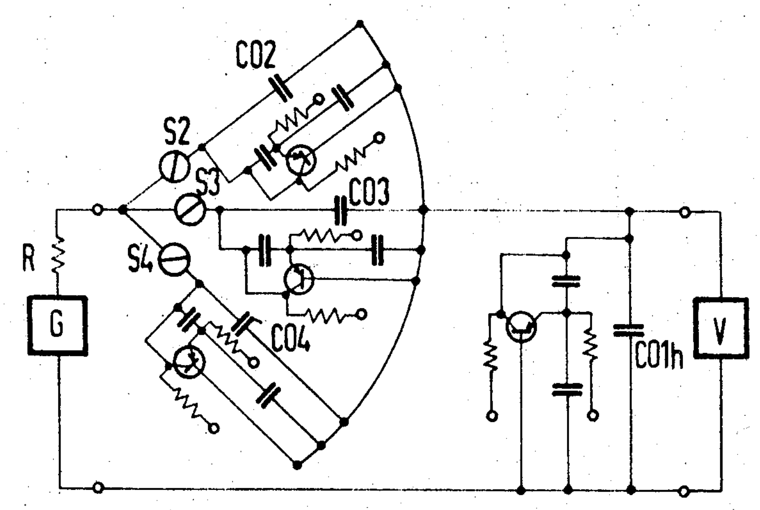

FIGS. 5 and 6 comprise quadripole or four terminal frequency filters. In each of FIGS. 5 and 6, the quadripole filter is connected at its input terminals, through a resistor R which may be of very small resistance, to a signal generator G and at its output terminals to a utilization circuit V. The principal capacitor C01*h* is connected in shunt across the output terminals of the filter and thus across the utilization circuit V. The auxiliary capacitors C02 C03, and C04 are connected in a longitudinal direction within the filter, and, more particularly, in parallel relationship in a first one of a pair of line conductors of the filter. Switches S2, S3, and S4 are connected in series circuits with the respectively associated auxiliary capacitors C02, C03 and C04 for controlling pulse-type energy exchanges therewith. The series circuits of the corresponding switches and auxiliary capacitors are therefore connected in parallel in the first line conductor. Each of the auxiliary capacitors C02, C03 and C04 is connected at a common terminal to the principal capacitor C01*h* In the embodiment of FIG. 5, an inductance coil L is connected between the auxiliary capacitors C02, C03, and C04 and the principal capacitor C01*h*, for a purpose to be described. The coil L, in the alternative to the connection shown in FIG. 5, could be connected in the second line conductor of the filter, and thus between the principal capacitor C01*h* and the generator G, without any resultant change in the filter operation.

The filter characteristics of the quadripole filters of FIGS. 5 and 6 result from energy exchanges between the principal and auxiliary capacitors in accordance with control of the associated switches. (Examples of prior are frequency filters similar to those of the invention but not effecting the charge exchange operation as provided by the invention mad may be found in Trans IRE, PGAE, Dec. 1953, pp. 21—26, in particular FIG. 9.)

In FIG. 5, the pulse-type energy exchanges of the type required by the invention are developed by the function of coil L. Coil L in FIG. 5 operates in a manner identical to its function in the circuit of FIG. 1, described previously. Successive operations of switches S2, S3, and S4 in response to periodic control pulses causes pulse-type energy exchanges to occur in a corresponding sequence between the auxiliary capacitors C02, C03, and C04 and the principal capacitor C01*h*, As discussed with reference to FIGS. 1 and 3, the coil L forms a resonant circuit with the principal capacitor C01*h* and the given one of the auxiliary capacitors C02, C03, and C04 participating in a given charge exchange. The associated switch participating in that exchange must therefore be closed accurately for a time interval equal to a complete half-cycle of the characteristic frequency of the resonant circuit thus established, to assure a complete energy exchange between the participating auxiliary and principal capacitors.

In FIG. 6, the pulse-type energy exchanges between the auxiliary capacitors C02, C03, and C04 and the principal capacitor C01*h* are effected in substantially the identical manner as in FIG. 5, the through operation of the switches S2, S3 and S4 in response to periodic control pulses. In the filter of FIG. 6, however, a compensation circuit in accordance with the teaching of FIG. 2 is provided for each of the auxiliary capacitors C02, C03, and C04, and for the principal capacitor C01*h*.

Prior art switching-type frequency filters demonstrate a number of characteristic resonant frequencies if appropriate control pulses are employed too to operate the switches. The frequency filters of the invention also demonstrate a series of characteristic or resonant frequencies. The pulse repetition rate determines the basic frequency, and the series of frequencies are related to the basic frequency number multiples thereof, or harmonic frequencies. The number of the utilizable harmonic frequencies, however, is a function of the number of auxiliary capacitors, and may be changed by changing the number of longitudinally located auxiliary capacitors.

The pulse exchange operation of the filters of the invention results in a substantial reduction in the losses inherent in prior art filters of this type. However, other energy losses also occur which are common to both prior art filters and the filters of the invention. These energy losses occur particularly during charging of the capacitors in the pulse-type energy exchanges during switch switch actuation, either as a result of dissipation in the resistive elements of the circuit, including the switch contacts and connecting lines, and of losses associated with the discharging of the capacitors over their dielectric material and in the subsequent charging thereof. As noted previously, loading of the signal source during recharging of the capacitors C02, C03, and C04 over their respective switches S2, S3, and S4 to compensate for these losses is especially detrimental.

The filters of the invention may provide additional compensation for these dissipation losses, in accordance with the following explanation. If the auxiliary capacitors have a different capacitance value than that of the principal capacitor, the charge exchanges between the principal and auxiliary capacitors are modified, as explained hereafter. However, the basic function of pulse-type charge exchange with substantial elimination of energy losses during the exchanges is retained even under these conditions of unequal capacitance values of the auxiliary and principal capacitors.

In the quadripole filter of FIG. 6, substantially complete compensation for energy losses of the pulsed exchanges is s ache achieved for the condition that the sub supplemental capacitors of the parallel compensation for energy losses of the pulsed exchanges is achieved for the condition that the supplemental capacitors of the parallel compensation circuits associated with the auxiliary and principal capacitors are of the same capacitance value. If the capacitance value of the supplemental capacitors is smaller, a residual attenuation of the charge will occur. By contrast, if the capacitance values of the supplemental capacitors is greater, amplification of the stored charge may be achieved, whereby compensation for other losses in the circuit may also be provided. A complete explanation of the conpensation effect of these parallel compensation networks is provided in the above-noted Belgium Pat. No. 657,316 corresponding to German Pat. No. 88,828 and U.S. Pat. Ser. No. 417,970 of Max Schlichte now Pat. No. 3,303,286.

By providing supplemental capacitors having capacitance values greater than those of the respectively associated auxiliary and principal capacitors, the filter circuit of FIG. 6 has a very sharp, or peaked, resonant characteristic. A further increase in the capacitance value of the supplemental capacitors may result in producing oscillations in the filter circuit. For reasons to be explained hereafter, it may be desirable that the capacitance values of only certain supplemental capacitors be larger than that of the associated capacitor which participates in the energy exchanges. In particular, the dipole filter of FIG. 8 may be operated with such unequal capacitance values of supplemental capacitors.

The provision of inductance coils in the transmission paths through which charge exchanges take place, such as in the circuit of FIG. 5, may also effect an amplification of the charges to compensate losses in the circuit. For this purpose, the inductance coil is operated as a parametric amplifier wherein, by a controlled change of the inductance value thereof, energy transmitted through the coil may be amplified. (Examples of such operations of inductance coils may be found in the following articles: Long Distance Communication Practice, Vol. 37, No. 6, Mar. 15, 1960 pp. 201—228, in particular, page 227; Bulletin of the Swiss Electro-Technical Association, 1960, pp. 1046 —1053; proceedings IRE, July 1956 pp. 904-—913 and May 1958, pp, 850—866; and German Pat. No. S 80, 489.) In accordance with the teachings of these referenced articles, it will be apparent that the filter of FIG. 5 may provide not only complete energy exchanges but also compensation for losses in the circuit, including the dielectric losses in the capacitors and other unavoidable energy dissipation.

Figure 7:
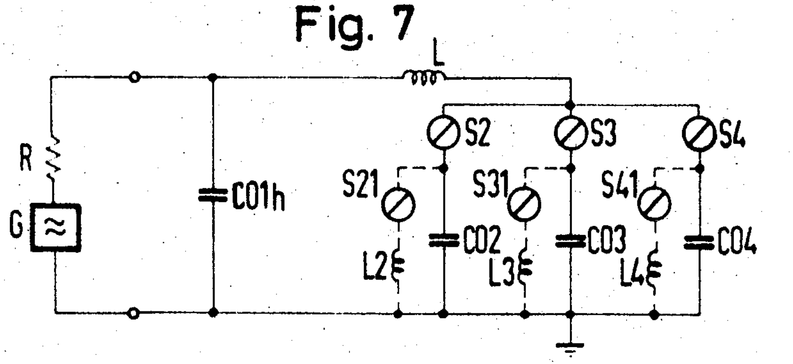
FIGS. 7 and 8 show further embodiments of dipole, or two terminal, networks operative as frequency filters in accordance with the invention.
Figure 8:
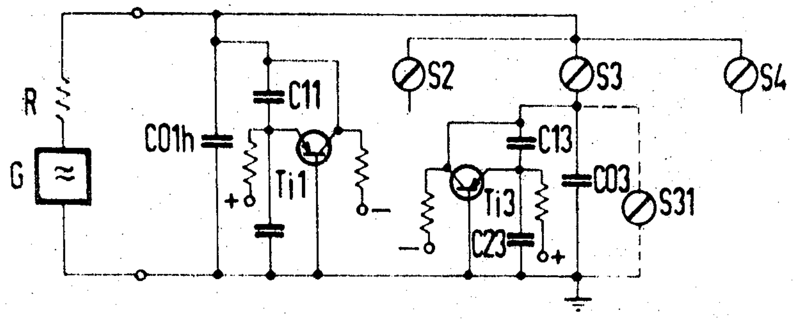

In FIGS. 7 and 8 there are shown further embodiments of the invention comprising dipole or two terminal filter circuits. In each of these filters, similarly to those of FIGS. 5 and 6, there is provided a principal capacitor C01*h* and auxiliary capacitors. In FIG. 7 these auxiliary capacitors are shown as capacitors C02, C03, and C04; in FIG. 8 only a single auxiliary capacitor C03 is indicated, although it is apparent that additional auxiliary capacitors corresponding to the capacitors C02 and C04 of FIG. 7 would also be provided. In each of the filter circuits of FIGS. 7 and 8, the input terminals of the dipole networks are connected to a signal generator G through a resistance R, the principal capacitor C01 *h* being connected in shunt between the line conductors at the input terminals. In each of the filters of FIGS. 7 and 8, the auxiliary capacitors C02, C03, and C04 are connected in series circuits with corresponding switches S2, S3, and S4, the series circuits being connected in parallel and in shunt between the pair of line conductors. The switches S2, S3, and S4 are operated by periodic control pulses to effect, in a sequential manner, energy exchanges between the principal capacitor C01*h* and each of the respectively associated auxiliary capacitors C02, C03, and C04.

In the filter of FIG. 7, inductor L is connected in circuit in the line conductor between one terminal of the principal capacitor C01 and a common terminal of the switches S2, S3, and S4. The inductor L operates to produce pulse-type energy exchanges in a manner substantially identical to that described previously with regard to FIGS. 1, 3, and 5. The purpose of the auxiliary switches S21, S31, and S41 and the respectively associated auxiliary inductance coils L2, L3, and L4 is described hereafter.

In each of FIGS. 7 and 8, pulse-type energy exchanges occur between the principal capacitor C01*h* and each of the auxiliary capacitors C02, C03, and C04, in a sequential manner. Generator G may apply either amplitude modulated signal impulses or sign wave alternating current signals to the input terminals of the filters. An input signal charges a given auxiliary capacitor, which then serves as a storage capacitor, only when the respectively associated switch is closed. The auxiliary capacitors are therefore somewhat analogous to the function of storage capacitors of a register for storing an indication of scanning samples, as is well known in the art. (See Trans. IRE, PGAE, Dec. 1953, pp. 21—26 in particular, FIG. 7.) In the intended mode of operation, the frequency filter described in the cited article demonstrates several characteristic frequencies which are determined by the pulse repetition rate of control pulses which effect closure of the switches incorporated in the filter. In the filter of the cited article, one of the characteristic frequencies is identical to that of the frequency or pulse repetition rate of the control pulses, whereas others of the characteristic frequencies are even numbered multiples, or harmonics, of the control pulse repetition rate. These characteristic frequencies are independent of the number of capacitors employed in the filter.

The properties of the frequency filters of FIGS. 7 and 8 are substantially different from those of switch-type frequency filters heretofore known, such as those of the cited article. This results from the charge exchanges with the central, principal capacitor C01*h*. The voltages or charges developed on the auxiliary capacitors at the resonant or characteristic frequency of the filter do not represent or correspond exactly to the applied input signals, whether the latter comprise signal impulses or alternating signals. By contrast, under normal conditions, an active charge exchange occurs between the auxiliary capacitors and the principal capacitor. As a result, a characteristic frequency is not thereby determined exclusively by control pulse repetition rate, but is now also dependent on the number of auxiliary capacitors utilized in a given filter. The characteristic frequencies of the filters of FIGS. 7 and 8, or those frequencies at which these filters demonstrate a parallel resonance characteristic are defined by the expression:

$$f=\frac{K\cdot N}{T\cdot(N+1)}$$

In this expression, $N$ represents the number of auxiliary capacitors of the frequency filter, $T$ represents the time interval between two control pulses which are applied to a given switch, and $K$ is any whole number, including 0.

It is apparent from the expression (1) that a basic resonant frequency and several harmonics thereof are exhibited by the frequency filters of FIGS. 7 and 8. However, in the intervals between two harmonically related frequencies, there will occur other characteristic frequencies which are comparable to series resonant frequencies of a filter. Thus, by employing different numbers of auxiliary capacitors, the frequency intervals or spacing between characteristic frequencies of the filter may be changed even for a fixed frequency of the control pulses.

In the circuit of FIG. 7, advantageous characteristics result from the fact that the principal capacitor C01*h* may operate with the resistor R as a low pass filter at the input to the pulse-type energy exchange portion of the filter circuit of the invention. The inductor L, in the manner described previously, assists in substantially eliminating energy losses which may occur in the circuit. The frequency filter of FIG. 7 therefore demonstrates a sharply tuned resonant curve characteristic, particularly compared to filters known heretofore in the prior art.

As noted previously, the filter of FIG. 8 is provided with parallel compensation networks in accordance with the teachings of FIG. 2. The principal capacitor C01*h* is provided with such a network, the network including supplemental capacitor C11, a transistor amplifier element T11, and associated elements. Only a single one of the plurality of auxiliary capacitors, namely capacitor C03, is shown, for which there is provided a similar parallel compensation network including supplemental capacitor C13 and transistor amplifier element T13. It is understood that such a parallel compensation network is provided for each auxiliary capacitor. The compensation effect and the switching of the elements of the parallel compensation networks is completely in accord with the foregoing description of these networks in FIG. 2, Further, the sequence of switch con actuation and the frequency filter characteristics of the filter of FIG. 8 are completely in accord with the description of these functions and characteristics for the filter of FIG. 7.

In a each of FIGS. 7 and 8 there are indicated additional elements which may be provided to modify the characteristics of these filters, and which comprise further embodiments of the invention. In FIG. 7 there are provided auxiliary switches S21, S31, and S41 connected in series with auxiliary inductors L2, L3, and L4, respectively, the series circuits being connected across corresponding ones of the auxiliary capacitors C02, C03, and C04. These elements may be provided at very slight additional expense and may be operated to cause the filter of FIG. 7 to have a frequency characteristic corresponding to a series resonant circuit.

Each of the auxiliary switches S21, S31, and S41 is switched in response to control pulses from a normally open to a normally closed position in the interval between two successive actuations of the associated switches S2, S3, and S4. In accordance with the description of FIG. 1 for the short circuited output condition, it will be understood that the actuation of a given auxiliary switch during the indicated time period will effect a reversal of the charge on its associated auxiliary capacitor. For example, during the interval between successive actuations of switch S2, S21 is closed, thereby completing a resonant circuit path including the auxiliary inductor L2 and the auxiliary capacitor C02. The interval during which switch S21 is closed is equal to one-half of the resonant frequency of the circuit thus established, whereby the capacitor C02 is discharged and recharged to the opposite polarity but in the same magnitude as that of the initial charge. Switch S21 is then opened and capacitor C02 retains this equal magnitude, opposite polarity charge; this charge then is presented to the filter circuit upon the subsequent actuation of switch S2.

It is apparent, therefore, that at each characteristic frequency for which the filter circuit of FIG. 7 demonstrated parallel resonant characteristics in the absence of the auxiliary switches and inductors, there is now developed a series of resonance characteristic. Conversely, at those characteristic frequencies at which the filter circuit previously demonstrated a series resonance characteristic, the provision of the auxiliary switches and inductors causes the filter to have parallel resonance characteristic.

The effects obtained through the use of the auxiliary switches and inductors in FIG. 7 may be obtained in the filter of FIG. 8 through the provision of auxiliary switches connected in shunt across each of the auxiliary capacitors. For example, auxiliary switch S31 is connected across the auxiliary capacitor C03. Such an auxiliary switch is provided for each auxiliary capacitor of the filter of FIG. 8, although not shown. These auxiliary switches are operated in the identical manner as explained with regard to the auxiliary switches in the alternative embodiment of FIG. 7, and produce the identical effect, namely that of reversing the polarity of charge across the associated auxiliary capacitor. This charge reversal function is identical to that previously explained with regard to the modified embodiment of FIG. 2, in which the output side of the system is short circuited.

As previously described with respect to FIGS. 3 and 4, the signal generator G of each of FIGS. 5—8 may produce either amplitude modulated impulses or sine wave alternating current signals which are applied to the frequency filters. Combinations of the frequency filters of the invention may be utilized; in any such combination, the filter properties will be a composite of the characteristic frequencies of the filters utilized. As discussed previously, the characteristic frequencies of these filters is a function of the pulse repetition rate of the control pulses applied to the switches of the filter. It is apparent, therefore, that when combinations of filters are employed, the composite filter characteristic may also be changed in accordance with changes in the control pulse repetition rates. Special filter effects may be obtained, if desired, by independently changing the pulse repetition rates of the control pulses applied to selected ones of the filters provided in the combination filter.

In the foregoing descriptions of operation of the frequency filters of the invention, it has been assumed that the capacitors which participate in the charge exchanges of are of equal capacitance value. It was noted, however, that the participating capacitors may be of different capacitance values and the that modifications of the charge exchanges would thereby result. The use of participating capacitors of different capacitance values was particularly noted in the frequency filters of FIGS. 5 and 6. Similarly, in the embodiments of the frequency filters shown in FIGS. 7 and 8, the participating capacitors, namely the principal and auxiliary capacitors may be either of equal or different capacitance values, with resultant modifications in the characteristics of the filters.

If capacitors of different capacitance values are utilized in the filters, it must nevertheless be assured that proper pulse-type charge exchanges occur between capacitors of different capacitance values which are participating in the exchange. Further, energy losses are assumed to be compensated in accordance with the foregoing teachings of the invention. The charge exchange, however, is modified as a result of a reflection of the exchanged charge according to the factor:

$$r=\frac{c_1-c_2}{c_1+c_2}$$

In this expression $c_1$ represents the capacitance value of the capacitor on which is developed the charge to be transmitted and $c_2$ represents the capacitance value of the capacitor which is to receive the transmitted charge, during a pulse energy exchange. It can be demonstrated that a charge exchange between two participating capacitors is a linear function relating to the initially established charge on either or both of the participating capacitors. Thus, where each of the participating capacitors initially contains a charge and these participating capacitors are of different capacitance values, a modified charge exchange between the two participating capacitors in accordance with expression (2) above will occur both from the first to the second as well as from the second to the first of the participating capacitors, without interference.

The frequency filters of the invention possess particularly desirable characteristics for utilization with time multiplex systems. Time multiplex systems typically have several connection channels, each of which may provide amplitude modulated signal impulses representing information transmitted in time-shared relationship. The frequency filters of the invention can be supplied with the time multiplex signal impulses alternately from different ones of the connection channels of the multiplex system. Such operations are readily provided since a time multiples system typically includes the necessary switches for effecting distribution of the signal impulses corresponding to the different connection channels. Further, the time multiplex systems typically include pulse generators for generating pulse trains necessary for other portions of the system which may be employed as the control pulses in the frequency filters of the invention.

The frequency filters of the invention, in any of the various embodiments thereof, comprise a limited number of relatively simple components, namely switches, capacitors, and, in some embodiments, transistors, resistors, and induction coils of relatively small inductance values. In addition to the reduction in physical size of the networks, resultant from the capability of employing inductors of small inductance values and therefore of small physical size, integrated circuit techniques may readily be employed for manufacturing these networks. Further reduction in size and savings in costs of manufacturing these networks are thereby obtained, in addition to the other attendant, desirable features of integrated circuits. These savings in space and construction costs are substantial, compared to the requirements for conventional circuits of this type. The frequency filters of the invention, whether constructed with conventional components or in integrated circuits, are extremely stable in operation, since the characteristic frequencies thereof are not dependent of on the reactance values of the components employed therein, but only on the control pulse repetition rates. Further, these filters possess the highly desirable characteristic that by the simple expedient of changing the control pulse repetition rates applied to the switches thereof, the characteristic frequencies of the filters may be changed, as desired. With regard to the alternative embodiments of FIGS. 7 and 8, it si will be appreciated that the auxiliary switching elements of these filters may be selectively operated or not, as desired, by merely applying or not applying an appropriate control pulse train thereto, whereby a substantial modification of the characteristics of these filters may be obtained without effecting any change in the actual circuit of the filter.

It will be evident that many changes could be made in the systems of the invention without departure from the scope thereof. Accordingly, the invention is not to be considered limited to the particular embodiments disclosed herein, but only by the scope of the appended claims. It is therefore intended by the appended claims to cover all such modifications and adaptions as fall within the true spirit and scope of the invention.

We claim:

1. A frequency filter responsive to control pulses the repetition rate of which selects the characteristic frequency of the filter, comprising:
  first and second line conductors connected to corresponding first and second input terminals (*e*1, *e*2) of the filter;
  energy storage means (C1, C2; C01, C02; C03, C04, C01*h*- connected to said first line conductor; and
  switching means (S*a*, S*b*; S2, S3, S4) connected to said first line conductor within said filter and with the corresponding energy storage means, said switch means being operated by the control pulses to complete a circuit for effecting pulse-type energy exchanges in said associated energy storage means within said filter, the rate of operation of said switch means being a function of the repetition rate of said control pulses and determinative of the characteristic frequency of the filter.

2. A frequency filter as recited in claim 1 wherein there is further provided:
  induction means (L*a*, L*b*; included in said energy exchange circuit; and
  said switching means S*a*, S*b*; S2, S3, S4) is actuated in response to the control pulses to complete a resonant circuit including said induction means (L*a*, L*b*; L) and said associated energy storage means (C, C02, C03, C04) for a time interval equal to one-half the period of the resonant frequency of the resonant circuit for effecting a complete energy exchange.

3. A frequency filter as recited in claim 2 wherein:
  said induction means is operative as a parametric amplifier to compensate for energy losses occurring in said filter.

4. A frequency filter as recited in claim 1 wherein there is further provided:
  supplemental energy storage means (C11, C12) connected in a parallel circuit with said energy storage means (C01, C02) of said filter;
  said parallel circuit including an amplifier element T12) connected to said energy storage means (C01, C02) and operative during intervals between pulse energy exchanges therein to supply said supplemental energy storage means (C11, C12) with a charge corresponding to that of said energy storage means (C01, C02); and
  said supplemental energy storage means (C11, C12) providing a charge during a pulse energy exchange in said energy storage means to compensate for energy losses in said filter during the pulse energy exchange.

5. A frequency filter as recited in claim 1 wherein: said energy storage means are connected in shunt between said first and second line conductors; and
  said switching means are connected in circuit in said first line conductor and operated in response to the control pulses to complete a circuit through said first line conductor for effecting the pulse-type energy exchanges in said corresponding energy storage means within said filter, the rate of operation of said switch being a function of the repetition rate of said control pulses and determinative of the characteristic frequency of the filter. 34

6. A frequency filter as recited in claim 5 wherein:
  said energy storage means comprises first and second capacitors (C1, C2; C01, C02); and
  said switching means comprises first and second switches (*sa*, S*b*) connected in series circuit in said first line conductor, said first switching means (S*a*) being connected between the connections of said first and second capacitors (C1, C2; C01, C02) to said first line conductor.

7. A frequency filter as recited in claim 6 wherein:
  said first and second line conductors define an output side of said filter remote from said input terminals (e(*e*1, E2) thereof, and there is further provided:
  a short circuit connection between said first and second line conductors at said output side of said filter.

8. A frequency filter as recited in claim 5 wherein there is further provided:
  first and second supplemental capacitors (C11, C12) connected in parallel circuit with said first and second storage capacitors (C01, C02), respectively;
  each of said parallel circuits including an amplifier element (T11, T12) connected to said associated storage capacitor (C01, C02) and operative during intervals between pulse energy exchanges therein to supply said supplemental capacitor (C11, C12) with a charge corresponding to that of said associated storage capacitor (C01, C02); and
  each of said supplemental capacitors (C11, C12) providing a charge during a pulse energy exchange in said respectively associated storage capacitor (C01, C02) to compensate for energy losses in said filter during the pulse energy exchange.

9. A frequency filter as recited in claim 8 wherein:
  each of said supplemental capacitors has a capacitance value equal to that of the respectively associated storage capacitor.

10. A frequency filter as recited in claim 8 wherein:
  at least selected ones of said supplemental capacitors have a capacitance value exceeding that of the respectively associated storage capacitors.

11. A frequency filter as recited in claim 1 wherein:
  said energy storage means comprises a principal capacitor (C01*h*) and a plurality of auxiliary capacitors (C02, C03, C04); and
  said switch means comprises a plurality of switches (S2, S3, S4) corresponding to said plurality of auxiliary capacitors (C02, C03, C04), each of said switches being operative in response to control pulses to independently complete a circuit for effecting pulse-type energy exchanges between said principal capacitor (**C01*h*) and each of said plurality of auxiliary capacitors (C02, C03, C04**).

12. A frequency filter as recited in claim 11 wherein:

said line conductors define an output side of said filter remote from said input terminals (*e* 1, E2) thereof;

said principal capacitor (**C01*h***) is connected in shunt between said first and second line conductors at said output side of said filter;

said plurality of corresponding switches S2, S3, S4) and auxiliary capacitors (C02, C03, C04) are connected in a corresponding plurality of series circuits;

Said plurality of series circuits are connected in parallel in said first line conductor, between said first input terminal and the connection to said first line conductor of said principal capacitor (**C01*h*); and a said switches (S2, S3, S4) are operated during individual tie time intervals to produce pulse-type energy exchanges between said principal capacitor (C01*h*); and each of said auxiliary capacitors (C02, C03, C04**).

13. A frequency filter as recited in claim 12 wherein:

said first and second line conductors define first and second output terminals at the output side of said filter; and utilization means (V) is connected to a said output terminals to receive an output signal from said frequency filter.

14. A frequency filter as recited in claim 11 wherein:

said principal capacitor (**C01*h*) is connected in shunt between said first and second input terminals, said corresponding plurality of switches (S2, S3, S4) and auxiliary capacitors (C02, C03, C04) are connected in a corresponding plurality of series circuits, said plurality of series circuits are connected in parallel and in shunt between said first and second line conductors; and said switches (S2, S3, S4) are operated in response to the control pulses to complete circuits for producing pulse-type exchanges between said principal capacitor (C01*h*) and each of said auxiliary capacitors (C02, C03, C04**).

15. A frequency filter as recited in claim 11 wherein there is further provided:

auxiliary switching means (S21, L2; S31, L3; S41, L4) respectively associated with said auxiliary capacitors (C02, C03, C04) and operative during intervals intermediate the intervals of switching of the respectively corresponding switches (S2, S3, S4) to effect a reversal of the polarity of the charge in said respectively associated auxiliary capacitors (C02, C03, C04).

16 A frequency filter as recited in claim 15 wherein;

each of said auxiliary switching means comprises an auxiliary switch (S21, S31, S41) and an auxiliary inductor (L2,

L3, L4) connected in a series circuit in parallel with said respectively associated auxiliary capacitor (C02, C03, C04); and each of said auxiliary switches (S21, S31, S41) is operative in response to a control pulse occurring during a time interval between successive actuations of the corresponding series connected switch (S2, S3, S4) of the respectively associated auxiliary capacitor (C02, C03, C04) to complete a resonant circuit of said respectively associated auxiliary capacitor (C02, C03, C04) and auxiliary inductor (C02, L2; C03, L3; C04, L4) to effect the charge polarity reversal.

17 A frequency filter as recited in claim 16 wherein:

each of said auxiliary switches (S21, S31, and S41) is closed to complete the resonant circuit for an interval one-half the period of the resonant frequency of the resonant circuit.

18. A frequency filter as recited in claim 1 wherein:

said energy storage means comprises a plurality of storage capacitors, each of said plurality of storage capacitors having the same capacitance value.

19. A frequency filter as recited in claim 1 wherein:

said energy storage means comprises a plurality of storage capacitors;

selected ones of said storage capacitors being of different capacitance values and effecting a reflection of the charge during a pulse charge exchange therebetween in accordance with the factor:

wherein $c_1$ and $c_2$ represent the capacitance value of the storage capacitors supplying and receiving a charge, respectively, during a pulse charge exchange.

20. A frequency filter as recited in claim 1 wherein there is further provided:

means (G) for applying amplitude modulated signal in impulses to said input terminals of said filter.

21. A frequency filter as recited in claim 20 wherein said sub supplying means comprises a connection channel of a time multiplex signalling system.

22. A frequency filter as recited in claim 1 wherein:

said energy storage means comprises a plurality of capacitors (C1, C2); and said switching means (**S*a*, S*b*) comprises a plurality of switches connected in said first line conductor for completing said energy exchange circuits between respectively associated capacitors, adjacent switches (S*a*, S*b***) being controlled during simultaneous time intervals and switches separated in said line conductor by an odd number of other switches being controlled during different time intervals in response to the control pulses.

UNITED STATES PATENT OFFICE
CERTIFICATE OF CORRECTION

Patent No. 3,564,146 Dated February 16, 1971

Inventor(s) Werner F. Poschenrieder, et al

It is certified that error appears in the above-identified patent and that said Letters Patent are hereby corrected as shown below:

Column 2, line 40, change "loss compensation" to read -- two terminal --.

Column 9, line 12, delete "s".

Column 9, line 13, delete "ache" and "sub".

Column 16, line 29, insert the following:

$$r = \frac{c_1 - c_2}{c_1 + c_2}$$

Signed and sealed this 26th day of December 1972.

(SEAL)
Attest:

EDWARD M.FLETCHER,JR.
Attesting Officer

ROBERT GOTTSCHALK
Commissioner of Pater